United States Patent [19]

Jacobs

[11] Patent Number: 4,648,183
[45] Date of Patent: Mar. 10, 1987

[54] CAN OPENER

[76] Inventor: Mark D. Jacobs, 2568 Violet St., San Diego, Calif. 92105

[21] Appl. No.: 788,399

[22] Filed: Oct. 17, 1985

[51] Int. Cl.⁴ .............................................. B24B 19/00
[52] U.S. Cl. .................................... 30/400; 51/241 S
[58] Field of Search ................ 30/400, 418, 425, 436, 30/442; 51/241 S

[56] References Cited

U.S. PATENT DOCUMENTS 2,180,640 11/1939 Mikalson ............................ 51/241 S
2,578,401 12/1951 Cunningham ......................... 30/418

FOREIGN PATENT DOCUMENTS 270560 2/1914 Fed. Rep. of Germany ......... 30/436

Primary Examiner—E. R. Kazenske
Assistant Examiner—Michael D. Folkerts
Attorney, Agent, or Firm—Fulwider, Patton, Rieber, Lee & Utecht

[57] ABSTRACT

A can opener for removing the top of an aluminum can having an upper rim encompassed by a peripheral crimp in the top, the can opener comprising a container having a cushioned can cavity for receiving an aluminum can, and a cover mounting a rotatable abrasive disk for engagement with the can top, the container and cover being threadably connected so that the disk can be positioned for proper engagement with the can top. Rotation of the disk abrades the aluminum of the can until enough of the peripheral crimp in the can top is removed to permit the top to be separated from the can.

6 Claims, 6 Drawing Figures

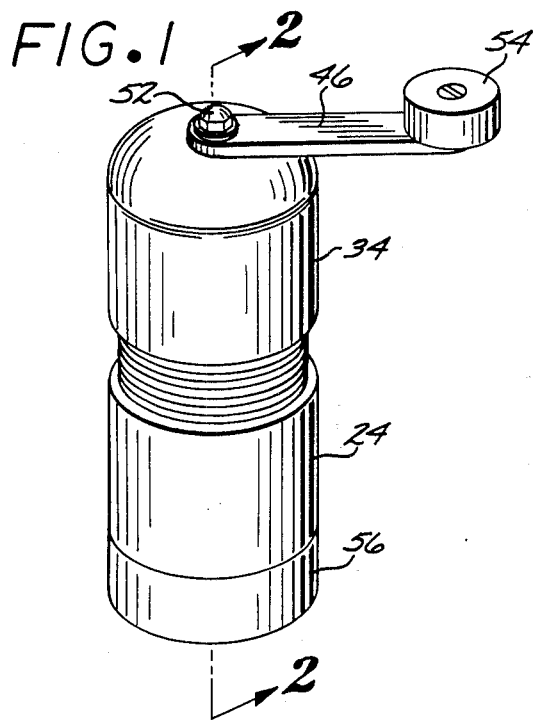
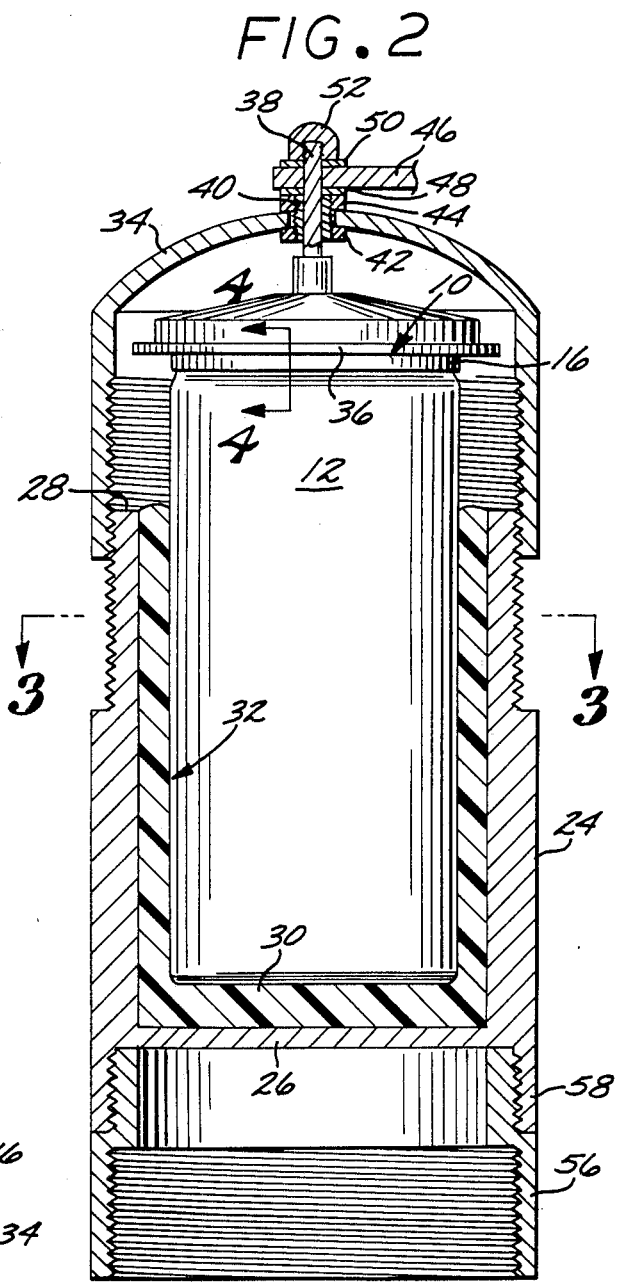
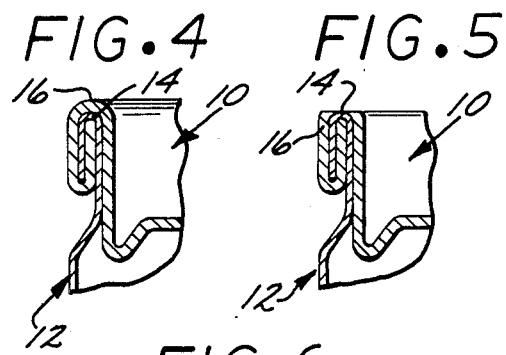
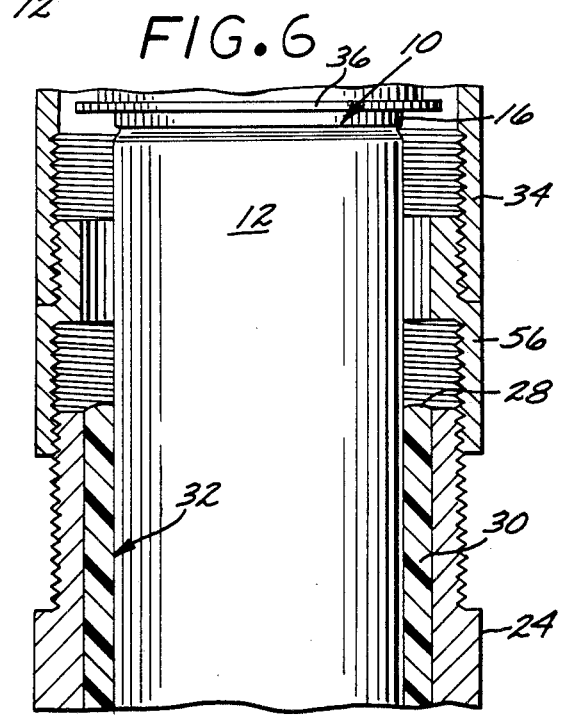
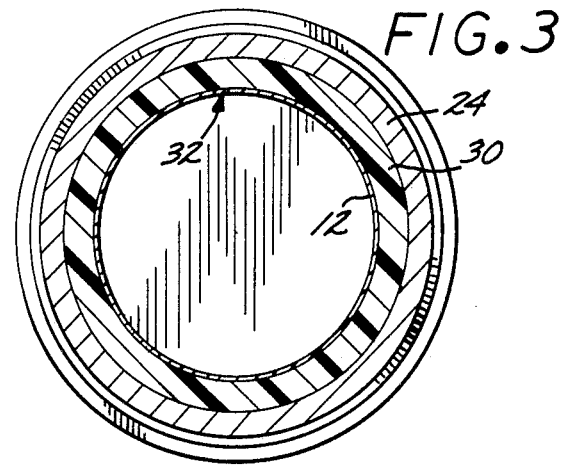

ial portion
CAN OPENER

BACKGROUND OF THE INVENTION

1. Field of the Invention

The present invention relates to a can opener for removing the top of an aluminum can by abrading away a portion of the can top.

2. Description of the Prior Art

Empty aluminum beverage cans are potentially useful containers for storing small articles, for growing plants, and for decoration by hobbyists for various purposes, including use as a drinking container.

The typical aluminum beverage can includes an upper rim, and the top includes a peripheral portion which is crimped upon the upper rim in sealing relation. Usual can openers depend for operation upon the existence of a metallic bead at the top of the can, which is engaged by the opener to support it and provided a track to guide the opener around the periphery of the top. There is no such bead on aluminum beverage cans. Other known can openers are not capable of removing the top of an aluminum can with sufficient precision to leave the upper rim of the can substantially intact so that it can provide a smooth surface for use of the can as a drinking container, for example.

SUMMARY OF THE INVENTION

According to the present invention, a can opener is provided comprising a cylindrical container which is open at its upper extremity to receive an empty aluminum beverage can. A cover is threaded upon the container upper extremity, and the rotated position of the cover adjusts the effective height of the internal can cavity. An abrasive disk is mounted for rotation within the cover for engagement with the aluminum can top. A resilient liner in the container permits limited movement of the can for proper engagement of the abrasive disk with the complete periphery of the crimp in the can top. The can opener includes means located externally of the cover which are coupled to the abrasive disk and which are operative to rotate the disk to abrade away the peripheral crimp in the can top to enable removal of the top from the can.

BRIEF DESCRIPTION OF THE DRAWINGS

FIG. 1 is a perspective view of a can opener according to the present invention;

FIG. 2 is an enlarged longitudinal cross sectional view of the can opener of FIG. 1 and illustrating an aluminum can in position for abrading;

FIG. 3 is a view taken along the line 3—3 of FIG. 2;

FIG. 4 is a partial detail view of the aluminum can prior to abrading;

FIG. 5 is a view similar to FIG. 4, but illustrating the can after abrading; and FIG. 6 is a partial longitudinal cross sectional view similar to FIG. 2, but illustrating the cover extension in operative position.

DESCRIPTION OF THE PREFERRED EMBODIMENT

Referring now to the drawings, and particularly to FIGS. 1-3 and 6, a can opener is illustrated which is particularly adapted for removing the top 10 of an aluminum can 12 having a main body with an upper rim 14 defined by a circumferentially continuous bead formed by reversely bending the aluminum material at the upper end of the can 12.

The aluminum cans for which the present invention is particularly suited are beverage cans in which the top 10 includes a "pop" top center portion which is grasped and bent to make an opening into the can 12. The periphery of the top 10 is formed into a peripheral crimp 16 which closely engages the rim 14 in fluid tight relation.

As will be seen, the present can opener is adapted to abrade away just enough of the crimp 16 sufficiently to bare the upper surface of the rim 14. This destroys the structural connection and allows the top 10 to be removed. This can be done, for example, by fitting the slotted end of a tool (not shown) into the beverage opening in the can top 10 and prying upwardly. Such a tool could include cutting ridges to smooth or dress down the exposed surface of the rim 14 and the remaining outer portion of the crimp 16 so that it will not scratch or cut a user when it is used, for example, as a drinking cup or container. The topless can 12 has many uses for hobbyists, being capable of decoration and use for holding plants, small articles, and the like.

The can opener used in removing the top 10 in the manner just described comprises an elongated cylindrical container 24 having a closed base 26, and an exteriorly threaded, open upper extremity 28.

A resilient liner 30 made of closed cell foam material or the like is disposed within the hollow interior of the upper extremity 28 to define a cushioned, upwardly open can cavity 32 for closely receiving the aluminum can 12. The liner is preferably approximately three eighths of an inch thick at its sides and one-half inch thick at its base. The liner 30 cradles the can 12 and allows limited movement of the can so that all portions of the crimp 16 will be located in the same plane as the abrading surface, as will be seen.

The can opener further comprises a cylindrical cover 34 which is internally threaded and which is closed at its upper end by a dome-like top. The internal threads of the cover 34 are adapted to engage upon the external threads of the container upper extremity 28. Thus, rotation of the cover 34 is adapted to adjust the internal height of the can cavity.

The present can opener also comprises abrading means including an abrasive disk 36 housed within the cover 34 and arranged for engagement with the crimp 16 of a can 12 in the can cavity 32, as seen in FIG. 4. Rotation of the disk 36 abrades the crimp 16 sufficiently to expose the underlying can rim 14 to thereby enable separation of the can top 10 from the can 12, as seen in FIG. 5.

The yieldability of the can linear 30 facilitates slight movement of the can 12 to establish uniform engagement of the disk 36 with all peripheral portions of the crimp 16 so that the rim 14 is bared or exposed uniformly.

The abrading means includes a drive shaft 38 attached at its lower extremity to the disk 36 and extending upwardly through an externally threaded bushing 40 disposed through a suitable opening in the dome portion of the cover 34.

The bushing 40 is threadably secured in place by a lower nut 42 bearing against the underside of the cover dome, and by a nut 44 bearing against the outside of the cover 34.

A crank arm 46 for rotating the shaft 38 includes an opening at one end which receives the upper extremity of the shaft 38. The arm 46 is disposed between bearing washers 48 and 50, and is held in position by a crown nut 52 threaded onto the upper extremity of the shaft 38.

The opposite or free extremity of the crank arm 46 mounts a rotatable knob 54 which can be grasped for rotating the crank arm 46 to rotate the disk 36 to which it is coupled.

In operation, the disk 36 is rotated until that portion of the crimp 16 connecting it to the can rim 14 is sufficiently abraded away. When a sufficient amount is abraded away, the top 10 can be removed, leaving only the outer peripheral portion of the crimp 16, as seen in FIG. 5.

Whether enough has been away can be determined periodically by removing the cover 34, or the cover 34 can be made of transparent material so that the abrading action can be continuously monitored.

The components of the can opener are dimensioned such that the can cavity 32 is adapted to receive a stadard aluminum beverage can, but the height of the interior of the can opener can be increased for larger beverage cans, such as a sixteen ounce size, by employing a cylindrical open ended cover extension 56. It is externally threaded at its upper extremity and internally threaded at its lower extremity. The cover extension 56 can be conveniently stored when not in use by threading its upper extremity within a depending, internally threaded base extension 58 integral with the base 26.

In use, the upper threaded portion of the cover extension 56 is threaded into the interior of the cover 34 to provide a vertical extension of the internal volume of the cover 34. The cover extension 56 is then threaded onto the container 24 in the same manner as the cover 34 was threaded upon the container 34, as best seen in FIG. 6.

The foregoing arrangement provides a means for hobbyists and children to busy themselves converting discarded aluminum beverage cans into topless containers having utility for various applications.

Various modifications and changes may be made with regard to the foregoing detailed description without departing from the spirit of the invention.

I claim:

1. A can opener for removing the top of an aluminum can having an upper rim encompassed by a peripheral crimp in the top, said can opener comprising:
    a cylindrical container closed at its base and open at its upper extremity;
    an abrasive disk;
    a cover mounted to said container and housing said abrasive disk for engagement with a peripheral crimp in the top of a can located in said container whereby rotation of said abrasive disk is operative to abrade said crimp sufficiently to expose the underlying can rim and thereby enable separation of the can top from the can, said cover being movable relative to said container to adjust the height of said disk to maintain continued engagement of the can top by said disk during the abrading operation;
    a resilient liner within said container defining a cushioned can cavity for receiving the aluminum can, said liner including a cylindrical portion for substantially coextensive engagement with the cylindrical outer surface of the can, said liner including a base to support the bottom of the can, the resilience of said cylindrical portion enabling said cylindrical portion in its compressed state to engage the can and constrain it against rotation, the resilience of said base enabling said base in its compressed state to urge the can upwardly against said disk; and
    means extending through said cover for rotating said abrasive disk.

2. A can opener according to claim 1 wherein said means for rotating said abrasive disc comprises a shaft coupled at its lower extremity to said abrasive disk, said shaft being rotatably carried by said cover, said means for rotating said abrasive disc further comprising a crank arm having a handle for rotating said shaft.

3. A can opener according to claim 1 wherein said upper extremity is threaded and said cover is threadably mounted to said container.

4. A can opener for removing the top of an aluminum can having an upper rim encompassed by a peripheral crimp in the top, said can opener comprising:
    a cylindrical container closed at its base and open at its upper extremity, said base of said container being threaded;
    an abrasive disk;
    a cover mounted to said container and housing said abrasive disk for engagement with a peripheral crimp in the top of a can located in said container whereby rotation of said abrasive disk is operative to abrade said crimp sufficiently to expose the underlying can rim and thereby enable separation of the can top from the can, said cover being movable relative to said container to adjust the height of said disk to maintain continued engagement of the can top by said disk during the abrading operation;
    means extending through said cover and operative to rotate said abrasive disk; and
    a cylindrical cover extension having upper threads and lower threads, said upper threads in a stored position of said extension being threadably engaged with the threads on said base of said container and, in a use position of said extension being threadably engaged with the threads of said cover, said lower threads in said use position being adapted for threadable engagement with the threads of said upper extremity of said container whereby said extension is operative to define an upper extension of said can cavity.

5. A can opener according to claim 4 wherein said base of said container is internally threaded; and said cylindrical cover extension is externally threaded.

6. A can opener for removing the top of an aluminum can having an upper rim encompassed by a peripheral crimp in the top, said can opener comprising:
    a cylindrical container closed at its base and open at its lower extremity, said upper extremity being externally threaded;
    an abrasive disk;
    an internally threaded cover threadably mounted to said container and housing said abrasive disk for engagement with a peripheral crimp in the top of a can located in said cavity whereby rotation of said abrasive disk is operative to abrade said crimp sufficiently to expose the underlying can rim and thereby enable separation of the can top from the can, said cover being threadably rotatable relative to said container to adjust the height of said disk to maintain continued engagement of the can top by said disk during the abrading operation;
    a resilient liner within said container defining a cushioned can cavity for receiving the aluminum can, said liner including a cylindrical portion for substantially coextensive engagement with the cylindrical outer surface of the can, said liner including a base to support the bottom of the can, the resilience of said cylindrical portion enabling said cylindrical portion in its compressed state to engage the can and constrain it against rotation, the resilience of said base enabling said base in its compressed state to urge the can upwardly against said disk;
a shaft rotatably carried by said cover and coupled at its lower extremity to said abrasive disk; and
an elongated crank secured at one extremity to the upper extremity of said shaft and including a handle at its opposite extremity for rotating said shaft and said abrasive disk.

* * * * *